(12) United States Patent
Masson et al.

(10) Patent No.: US 7,221,127 B2
(45) Date of Patent: May 22, 2007

(54) ALTERNATOR WITH RECTIFIER BRIDGE IN PARTICULAR FOR MOTOR VEHICLE

(75) Inventors: Philippe Masson, Grisy-Suisnes (FR); Michaël Chemin, Festigny (FR); Thierry Mandion, Champagne sur Seine (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/489,325

(22) PCT Filed: Oct. 9, 2002

(86) PCT No.: PCT/FR02/03429

§ 371 (c)(1),
(2), (4) Date: Sep. 20, 2004

(87) PCT Pub. No.: WO03/032465

PCT Pub. Date: Apr. 17, 2003

(65) Prior Publication Data

US 2005/0017694 A1   Jan. 27, 2005

(30) Foreign Application Priority Data

Oct. 9, 2001   (FR) .................................. 01 12959

(51) Int. Cl.
*F03B 63/00* (2006.01)

(52) U.S. Cl. ............................ 322/28; 322/29; 322/35; 322/72; 322/73; 322/100; 363/127

(58) Field of Classification Search .................. 322/28, 322/29, 35, 72, 73, 100, 1, 21; 363/127
See application file for complete search history.

(56) References Cited

U.S. PATENT DOCUMENTS

| 4,447,868 | A | * | 5/1984 | Turnbull | 363/81 |
| 4,636,706 | A | * | 1/1987 | Bowman et al. | 322/28 |
| 6,541,943 | B1 | * | 4/2003 | Wylie et al. | 322/28 |
| 6,664,767 | B2 | * | 12/2003 | Takahashi et al. | 322/28 |

FOREIGN PATENT DOCUMENTS

| EP | 0 525 255 A1 | 2/1993 |
| FR | 2 745 445 | 8/1997 |

OTHER PUBLICATIONS

Simutation of Avalanche Injection Filamentation in MOSFET VA Vashchenko, Y.B. Martynov.☐☐SRI "Pulsar" Okruzhnoi proyezed 27, 105187 Moscow ,Russian Federation.*

* cited by examiner

*Primary Examiner*—Darren Schuberg
*Assistant Examiner*—I A. Mohandesi
(74) *Attorney, Agent, or Firm*—Berenato, White & Stavish

(57) ABSTRACT

The alternator comprises a wound rotor and a stator with a number of phases connected to a rectifier bridge equipped with switches (7) in the form of MOS type transistors, such as MOSFET type transistors, characterised in that the transistors (7) are voltage-rated to work by avalanche effect or linearly in the case of a load dump.

10 Claims, 2 Drawing Sheets

ALTERNATOR WITH RECTIFIER BRIDGE IN PARTICULAR FOR MOTOR VEHICLE

FIELD OF THE INVENTION

The present invention concerns alternators of the multiphase type, in particular for motor vehicles.

PRIOR ART

As is known, an alternator comprises a casing carrying a rotor and a stator.

This stator comprises a body in the form of slotted laminations for mounting an armature winding having heads referred to as lead-outs extending either side of the body of the stator.

The alternator is most often of the three-phase or six-phase type and therefore comprises a number of coils on the basis of at least one coil per phase.

These coils are offset angularly and constitute the armature winding.

In a known manner, these coils are connected in a triangle or a star and are connected to a rectifier bridge mounted between earth and a positive supply terminal of the vehicle battery.

The rotor is fixed to a shaft mounted able to rotate in the casing by means of bearings, such as ball bearings.

The casing comprises two perforated parts for circulation of air. One of these parts is referred to as the front bearing, and the other part is referred to as the rear bearing. The bearings are metallic and connected to the vehicle earth.

The rotor comprises a field coil mounted between two claw-type finger poles.

The ends of the field coil are connected to two slip rings on which brushes connected to a voltage regulator are permitted to rub.

The rotor shaft carries at its front end a pulley installed on the outside of the casing and intended to be driven rotationally by the internal combustion engine of the motor vehicle via a transmission device comprising at least one belt.

The rear bearing of the casing carries a brush holder, the brushes of which cooperate with the slip rings carried by the rear end of the rotor shaft.

Conventionally the rotor carries, at its axial ends, fans installed below the lead-outs for cooling the alternator. In a variant, the alternator is cooled by water.

When the vehicle engine is running, the alternator pulley and the rotor shaft are driven rotationally so that the stator generates an alternating induced current, the rotor coil being excited.

The rectifier bridge converts the alternating induced current into direct current for charging the battery and/or supplying services.

In one embodiment, this rectifier bridge comprises diodes and a plurality of transistors mounted in parallel on the diodes as described for example in the document FR-A-2 745 445 to which reference should be made for further information. The transistors are of the MOS type and constitute switches.

In this document FR-A-2 745 445, the rectifier bridge is also a control bridge since the alternator operates reversibly in such a way that the alternator is used, on the one hand, as a current generator and, on the other hand, as an electric motor for starting the internal combustion engine of the motor vehicle.

In generator mode, the vehicle engine rotationally drives the rotor via the alternator pulley. In electric motor mode, the rotor rotationally drives the vehicle engine via the alternator pulley.

Such an alternator is referred to as an alternator starter. To do this, an electronic control unit is provided for controlling the transistors, which control the different phases of the alternator.

In this document, the transistors are advantageously of the MOSFET type so that by construction they incorporate a diode between their drain and source. They make it possible to implement the rectifier and phase control bridge with only transistor components which act as both switch and recovery diodes.

In electric motor mode, a direct current is imposed in the rotor coil, constituting the alternator inductor, and there are delivered, on the stator phases, phase-shifted signals which are ideally sinusoidal, and in a variant trapezoidal or square.

The control unit comprises means for recognising a coded signal authorising the starting of the internal combustion engine of the vehicle. This coded signal is transmitted to the control unit by sending means inside the vehicle.

The control unit drives the MOSFET transistors only if it receives the coded signal.

Sensors are provided for measuring the angular position of the rotor with respect to the stator in order to synchronise the control of the transistors. These sensors are for example Hall effect magnetic sensors.

A switch, such as a MOSFET transistor, is controlled by the control unit so as to short-circuit the voltage regulator in electric motor mode.

The diagram of FIG. 1 illustrates the alternator starter according to the document FR-A-2 745 445. For further information on the structure of the alternator starter, and in general terms of an alternator, reference should be made to the document FR A 2 806 2236.

FIG. 1 shows schematically at 1 the alternator pulley, at 4 the field-coil rotor, at 5 the stator phases mounted in a triangle, at 2 the control and rectifier bridge, at 3 the electronic control unit, at 9 the voltage regulator, at 10 the switch acting between the unit 3 and the regulator 9, at B the battery of the motor vehicle and at 11 the switch associated with the ignition key or with a card-based electronic control. In a variant, the regulator 9 and the switch 10 are integrated with the unit 3.

The references 6 and 7 depict respectively the diodes and the switches of the rectifier and control bridge acting between earth and the positive terminal of the battery B. The control unit sends signals A, B, etc. to the gates of the transistors 7.

To do this, the electronic control unit comprises drivers for controlling the transistors and sending the signals A, B, etc. to the gate, each driver being associated with a signal A, B, etc.

Normally, the vehicle battery, by means of its low internal resistance, suppresses the voltage peaks that occur in the electrical system of the vehicle.

Cables can break, losses of contact can take place. Sheddings of load referred to as "load dumps" can therefore occur.

It is therefore necessary to re-think the strategy to be adopted at the time of a load dump.

This strategy must permit supplying of services which are not disconnected, and therefore permit operation of the rectifier bridge in degraded mode.

Of course the rectifier bridge must support this degraded mode without damage, irrespective of its initial temperature.

The voltage of the on-board electrical network in the case of a load dump must not of course exceed a certain value, for example 35 V for a 14 V battery.

The load dump event must have a limited duration.

OBJECT OF THE INVENTION

The object of the present invention is to meet these wishes simply and economically.

According to the invention, an alternator of the above-mentioned type provided with a rectifier and control bridge equipped with switches in the form of MOSFET type transistors is characterised in that the transistors are voltage-rated to work by avalanche effect or linearly in the case of a load dump.

In a first embodiment, the MOSFET type transistors are voltage-rated to work by avalanche effect for a rated voltage less than a given or predetermined voltage in the case of a load dump.

This given or predetermined voltage corresponds to the maximum voltage specified in the specifications, for example 35 V for a 12 V battery.

In a second embodiment, the MOSFET type transistors are voltage-rated to work in avalanche mode for a voltage close to or greater than a given or predetermined voltage, which corresponds to the maximum voltage specified in the specifications, for example 35 V for a 12 V battery.

These transistors are made to work in linear mode at the time of the load dump by adding components of the Zener type.

Advantageously, each switch in an arm of the rectifier bridge comprises a number of transistors mounted in parallel.

In one embodiment, the linear operation is obtained by Zener effect.

BRIEF DESCRIPTION OF THE DRAWINGS

The following description illustrates the invention with reference to the accompanying drawings in which.

DESCRIPTION OF PREFERRED
EMBODIMENTS OF THE INVENTION

As stated above, in the case of load shedding, an overvoltage event referred to as a "load dump" occurs at the rectifier bridge comprising switches 7.

Figure 1:
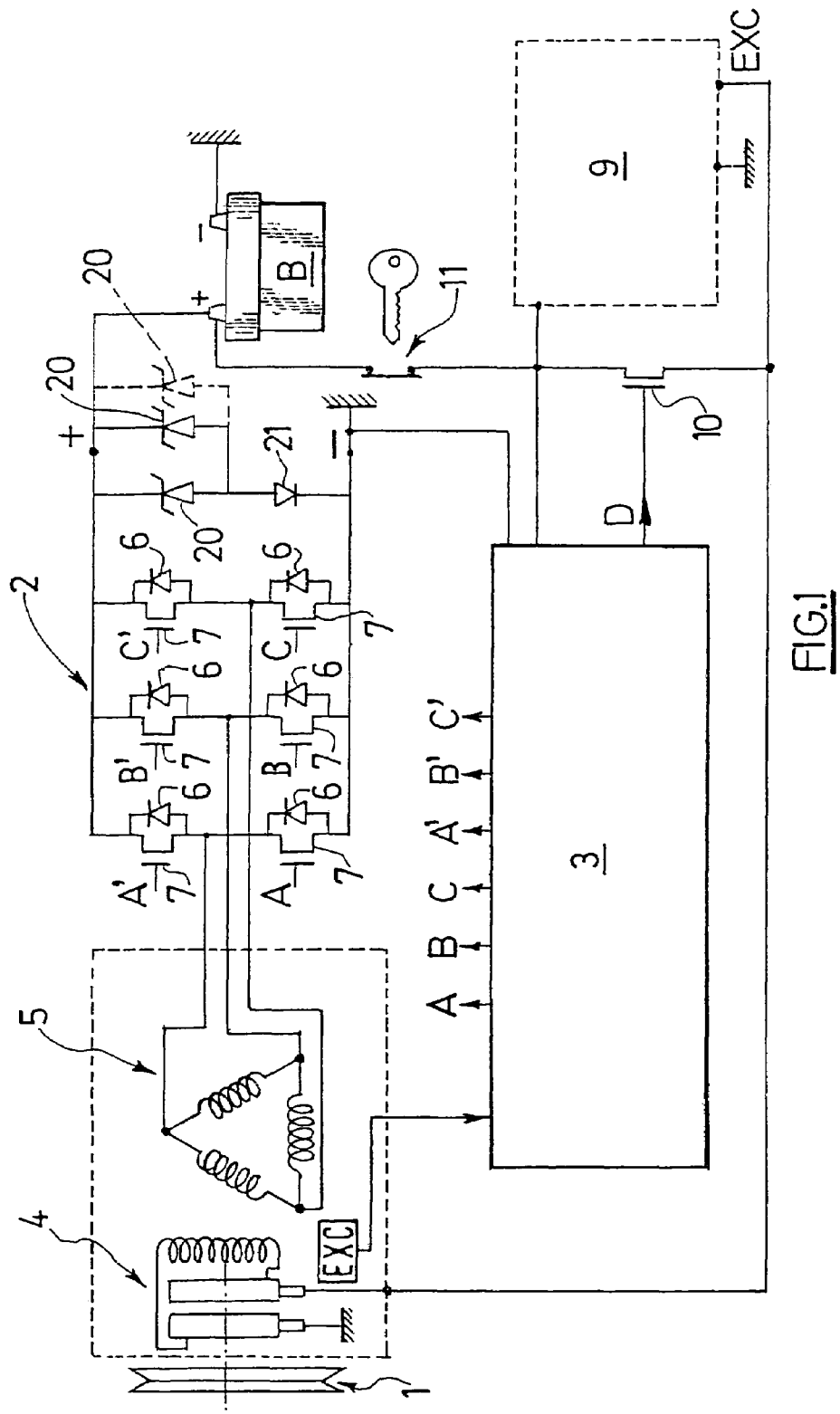
FIG. 1 is a schematic view of an alternator of the prior art.

To overcome this drawback, consideration can be given to using Zener diodes 20 added to the on-board electrical network as can be seen in dotted lines in FIG. 1.

These diodes are mounted in parallel and are associated with a protection diode 21 in case of faulty connection or assembly of the battery cables (cable reversal).

The introduction of these diodes 20 increases the size of the rectifier bridge as well as the cost thereof.

Figure 2:
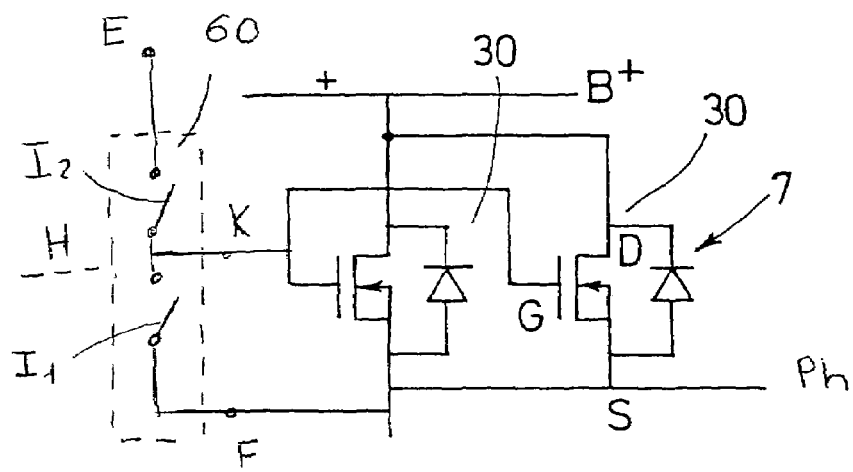
FIG. 2 is a schematic view of one of the switches of the rectifier bridge for a first embodiment according to the invention.

Thus advantageously in one embodiment according to the invention, use is made in FIG. 2 of a bridge with switches of the MOSFET type, voltage-rated to work by avalanche effect in the case of a load dump. In this figure, as in FIG. 3, only one of the switches of the rectifier bridge of FIG. 1 has been depicted for simplicity.

Figure 3:
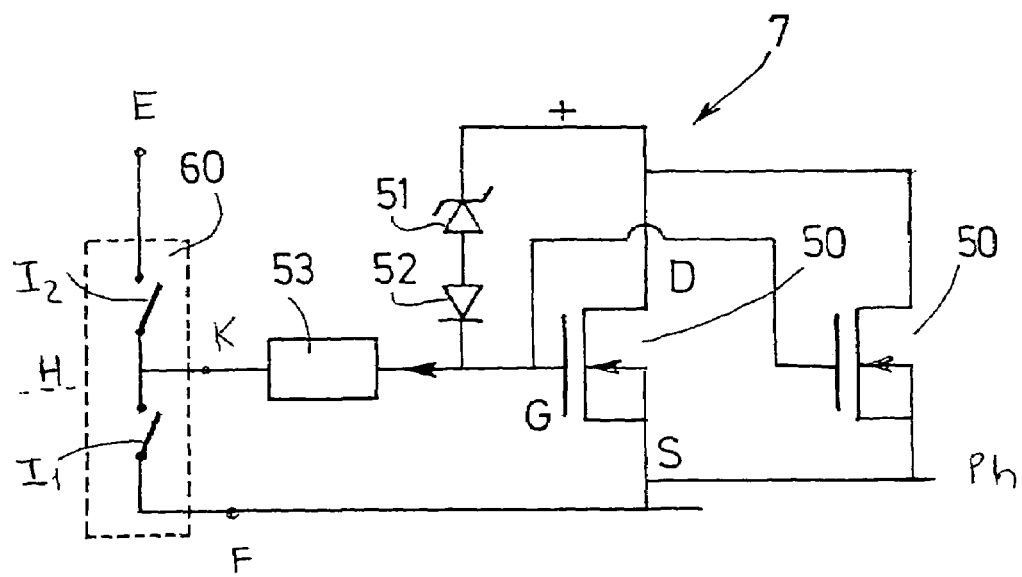
FIG. 3 is a view analogous to FIG. 2 for a second embodiment according to the invention.

In FIGS. 2 and 3, the reference Ph represents the phase concerned and the reference 60 represents the driver.

This driver belongs to the electronic control unit and is depicted schematically.

There is thus seen at E the power supply input, at F the power supply return (connected to the phase), at H the control signal input, and at K the output connected directly (FIG. 2) or indirectly (FIG. 3) to the gate of a transistor respectively 30, 50 described below. The driver comprises switches I2, I1.

In FIG. 2 for example for a battery voltage of 14 V, use is made of MOSFET type transistors 30, which are voltage-rated between 20 V and 27 V at 25° C.

This rated voltage is less than the given or predetermined voltage, here of the order of 35 V, in the case of a load dump (breaking of a power supply cable for example).

Limiting of the voltage of the on-board electrical network will then be guaranteed by the MOSFET transistors constituting the switches 7 of the rectifier bridge going into avalanche mode.

These rated transistors of 20 V to 27 V are not components of the type that is standard in the motor industry; nevertheless it will be appreciated that the overvoltage protection device is economic since it does not require the addition of new components. It will also be appreciated that it is not necessary to have a specific control in the case of overvoltage.

Each switch 7 of the rectifier bridge comprises, according to application, one or more transistors 30 mounted in parallel. In one embodiment, four transistors mounted in parallel are used for carrying the current during starting.

In FIG. 2, two transistors 30 mounted in parallel are provided.

In a second embodiment, MOSFET type transistors 50, voltage-rated to work linearly in the case of a load dump, are used as switches.

These transistors are voltage-rated so that this rated voltage is close to or greater than the permissible given or predetermined voltage in the case of a load dump.

In FIG. 3, for a 14 V battery and a given or predetermined permissible voltage, use is made of MOSFET type transistors 50 rated with a voltage greater than or equal to 30 V for a temperature of 25°.

Two transistors 50 mounted in parallel are provided here.

With this type of component, the avalanche voltage will be greater than 35 V when the junction temperature is greater than 175° C.

Limiting of the voltage to a maximum value of 35 V will be guaranteed by the power MOSFETs being put into linear conduction mode.

The MOSFET transistors going into linear operation is achieved by means of a Zener type diode 51 connected between the drain D and gate G of the transistor 50.

As soon as the potential difference between the drain and source of the MOSFET transistor exceeds the voltage threshold of the Zener diode 51, here 22 V, the gate potential adjusts automatically so as to limit the voltage VDS between the drain and source to a value close to the voltage Vz+Vth (Vz being the voltage of the Zener diode and Vth the voltage between the gate and source of the transistor 50 which allows turning on of the MOSFET transistor).

The voltage Vth is of the order of 2 V. Consequently, if a limiting voltage at 24 V is desired, it is necessary to choose a Zener diode with voltage Vz equal to 22 V.

A protection diode 52 for the driver 60 is mounted head-to-tail with the Zener diode in order to avoid, on the one hand, avoid loading the driver 60 at the time of an initiation command, and, on the other hand, correctly controlling the transistor.

Current-limiting protection is added to the driver 60 of the transistor in order to avoid its destruction where the MOSFET goes into linear mode during the load dump phase.

The gate resistor can be seen at 53. In the case of a load dump, the driver 60 must be capable of withstanding the current passing through it.

In FIG. 3, a potential difference of 15 V exists between the points E and F1.

Of course this depends on the application.

The additional cost of such an arrangement is very small since low power Zener diodes are being added.

Linear mode operation of the MOSFETs permits a greater area of safety than when they are working in avalanche mode.

This solution is capable of absorbing the most energy with a surface area of silicon identical to the preceding solution having the avalanche operating mode.

In the embodiments of FIGS. 2 and 3, at least two transistors mounted in parallel are provided in order to reduce the currents.

Of course, these embodiments described above are possible with a single transistor per switch. According to the current requirements, this transistor can be multiplied in an assembly comprising as many transistors in parallel as necessary for carrying the current to the engine during the starting phases.

These transistors can be associated with a device for rapid demagnetisation of the alternator in order to limit the duration of this load dump phase and therefore reduce the energy that the transistors must withstand. Such a device is described for example in the document FR A 2 802 365 to which reference should be made for further information. Such a rapid demagnetisation device is more particularly advantageous when the switch consists of a single or a small number of transistors in parallel since these must withstand the energy of the load dump.

Of course the voltage limiting device consisting of the Zener diode 51 and the protection diode 52 can be installed on each component constituting the switch. The same applies to the resistor 53.

This invention is applicable to on-board voltages other than that of 14 V, such as for example voltages of 28 volts or 42 volts.

In FIGS. 2 and 3, the presence of two aforementioned switches I1 and I2 at the driver 60 should be noted.

In the case of a load dump, the switch I1 closes whilst the switch I2 opens.

The invention claimed is:

1. Alternator, in particular for a motor vehicle, comprising:
a wound rotor (4) and a stator (5) with a number of phases connected to a rectifier bridge (2); said rectifier bridge (2) including at least six MOSFET transistors, wherein at least a first one of the MOSFET transistors (30) of the rectifier bridge (2) being voltage-rated to withstand avalanche effect for a rated voltage less than a predetermined voltage in the case of a load dump.

2. Alternator according to claim 1, wherein at least a second one of the MOSFET transistors (50) is voltage-rated to work linearly for a voltage close to or greater than the predetermined voltage in the case of the load dump.

3. Alternator according to claim 2, wherein a Zener type diode (51) is mounted between the drain and gate of the transistor.

4. Alternator according to claim 3, wherein a protection diode (52) is mounted head-to-tail with the Zener type diode.

5. Alternator according to claim 1, wherein each of the MOSFET transistors is associated with a rapid demagnetization device.

6. Alternator, in particular for a motor vehicle, comprising: a wound rotor (4) and a stator (5) with a number of phases connected to a rectifier and control bridge (2) equipped with switches (7) in the form of MOSFET type transistors, wherein the transistors (7) are voltage-rated to withstand avalanche effect or linearly in the case of a load dump; and wherein the rectifier bridge (2) is also a control bridge so that the alternator is used, on the one hand, as a current generator and, on the other hand, as an electric motor for starting the internal combustion engine of a motor vehicle.

7. Alternator according to claim 1, wherein the at least one of the MOSFET transistors (30) is voltage-rated between 20 V and 27 V at 25° C.

8. Alternator according to claim 2, wherein the at least one of the MOSFET transistors (50) is voltage-rated with a voltage greater than or equal to 30 V at 25°.

9. An alternator for a motor vehicle, said alternator comprising:
a wound rotor (4); and
a stator (5) having a number of phases connected to a rectifier bridge (2);
said rectifier bridge (2) including at least six MOSFET transistors;
at least a first one of the MOSFET transistors (30) of the rectifier bridge (2) being voltage-rated to withstand avalanche effect for a rated voltage less than a predetermined voltage in the case of a load dump,
wherein the rectifier bridge (2) being also a control bridge so that the alternator is used both as a current generator and as an electric motor for starting an internal combustion engine of the motor vehicle.

10. The alternator according to claim 9, wherein at least a second one of the MOSFET transistors (50) is voltage-rated to work linearly for a voltage close to or greater than the predetermined voltage in the case of a load dump.

* * * * *